United States Patent [19]

Bible

[11] 4,143,616

[45] Mar. 13, 1979

[54] PROCESS MACHINERY CONTROL SYSTEM AND INDIVIDUAL SAFETY CONTROL SYSTEMS THEREFOR OR THE LIKE

[75] Inventor: Harley V. Bible, Maryville, Tenn.

[73] Assignee: Robertshaw Controls Company, Richmond, Va.

[21] Appl. No.: 880,761

[22] Filed: Feb. 24, 1978

Related U.S. Application Data

[63] Continuation of Ser. No. 778,996, Mar. 18, 1977, abandoned.

[51] Int. Cl.[2] .......................... F16K 37/00; G08B 1/04

[52] U.S. Cl. .................................... 116/266; 137/552; 137/557

[58] Field of Search ...................... 116/2, 65, 67 R, 70, 116/114 AE, DIG. 7; 137/551, 552, 555, 557; 123/123, 142, 148 S, 198 D, 198 DB, 198 DC

[56] References Cited

U.S. PATENT DOCUMENTS

| | | | |
|---|---|---|---|
| 2,754,793 | 7/1956 | Sperry | 116/65 X |
| 2,868,155 | 1/1959 | Phillips | 116/65 X |
| 3,254,670 | 6/1966 | Puster | 137/557 |
| 3,720,182 | 3/1973 | Harrah | 116/65 |
| 3,948,207 | 4/1976 | St. Paul | 116/65 |

*Primary Examiner*—James J. Gill

*Attorney, Agent, or Firm*—Candor, Candor & Tassone

[57] ABSTRACT

A selectively changeable pneumatic control system for monitoring the start-up and running of process machinery, the system having a pneumatically operated indicator, a pneumatically operated arrangement for operating the indicator and a selector for setting the pneumatically operated arrangement to any one of a first, second, third, fourth or fifth monitoring condition thereof which monitors a respective variable of the process machinery and will operate the indicator to indicate an unsafe condition thereof, the first condition being adapted to monitor a variable of the process machinery that is normally safe when the process machinery is not running, the second condition being adapted to monitor a variable of the process machinery that is normally unsafe when the process machinery is not running but must be locked out to allow start-up and must become safe within a predetermined time period after initial start-up, the third condition being adapted to monitor a variable of the process machinery that is normally unsafe when the process machinery is not running but must be locked out to allow start-up and remain locked out an indefinite time period after start-up until it becomes safe, the fourth condition being adapted to monitor an alarm variable of the process machinery that requires immediate attention upon becoming unsafe, the fifth condition being adapted to monitor a position of a variable of the process machinery.

60 Claims, 7 Drawing Figures

CLASS A

CLASS B

CLASS C

ALARM

POSITION INDICATOR

PROCESS MACHINERY CONTROL SYSTEM AND INDIVIDUAL SAFETY CONTROL SYSTEMS THEREFOR OR THE LIKE

This is a continuation, of application Ser. No. 778,996, filed Mar. 18, 1977, now abandoned.

This invention relates to an improved pneumatic control system for process machinery or the like as well as to an improved individual safety control system for a variable of the process machinery or the like.

It is well known that pneumatic control systems have been provided for controlling the start-up and running of process machinery with such system including individual safety control systems each of which monitors a particular variable of the process machinery and will not only operate an indicator to indicate an unsafe condition thereof but also may initiate shutdown of the process machinery when an unsafe condition is sensed thereby.

It is a feature of this invention to provide an improved safety control system which merely requires the setting of a selector means thereof to anyone of a plurality of monitoring conditions thereof which causes the system to monitor a respective variable of the process machinery and operate an indicator to indicate an unsafe condition thereof as well as initiate a shutdown of the process machinery if the particular variable requires such a shutdown.

In this manner, a plurality of like safety control systems can be provided for a particular process machinery and each can be set to monitor the desired variable thereof merely by the setting of the selector means of each individual control safety system to the desired monitoring condition thereof.

In particular, one embodiment of this invention provides a selectively changeable pneumatic control safety system for monitoring the start-up and running of process machinery or the like, the system having a pneumatically operated indicator, pneumatically operated means for operating the indicator, and selector means for setting the pneumatically operated means to any one of a first, second, third, fourth or fifth monitoring condition thereof which monitors a respective variable of the process machinery and will operate the indicator to indicate an unsafe condition thereof, the first condition being adapted to monitor a variable of the process machinery that is normally safe when the process machinery is not running, the second condition being adapted to monitor a variable of the process machinery that is normally unsafe when the process machinery is not running but must be locked out to allow start-up and must become safe within a predetermined time period after initial start-up, the third condition being adapted to monitor a variable of the process machinery that is normally unsafe when the process machinery is not running but must be locked out to allow start-up and remain locked out an indefinite time period after start-up until it becomes safe, the fourth condition being adapted to monitor an alarm variable of the process machinery that requires immediate attention upon becoming unsafe, the fifth condition being adapted to monitor a position of a variable of the process machinery.

Such selectively changeable pneumatic control safety system also has means adapted for initiating shutdown of the process machinery when an unsafe condition is sensed by the pneumatically operated means and the selector means has set the same to its first, second or third monitoring condition.

Accordingly, it is an object of this invention to provide an improved safety control system for monitoring a particular variable of a process machinery, the system having one or more of the novel features of this invention as set forth above or hereinafter shown or described.

Another object of this invention is to provide a pneumatic control system for process machinery wherein such control system utilizes a plurality of the individual safety control systems of this invention.

Other objects, uses and advantages of this invention are apparent from a reading of this description which proceeds with reference to the accompanying drawings forming a part thereof and wherein.

Figure 1:
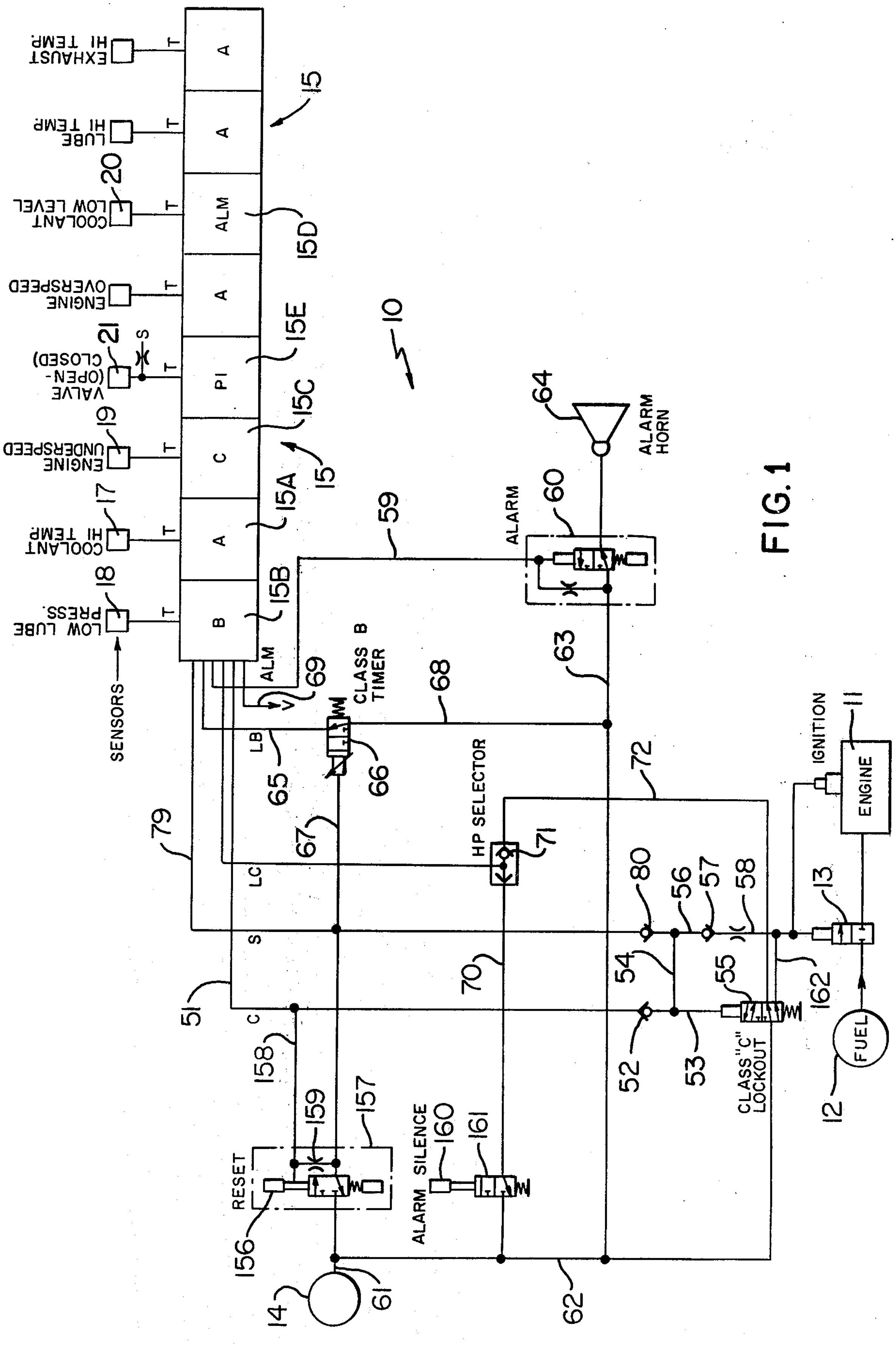
FIG. 1 is a schematic view illustrating the improved control system of this invention for controlling the operation of process machinery and utilizing a plurality of the individual safety control systems of this invention.
Figure 2:
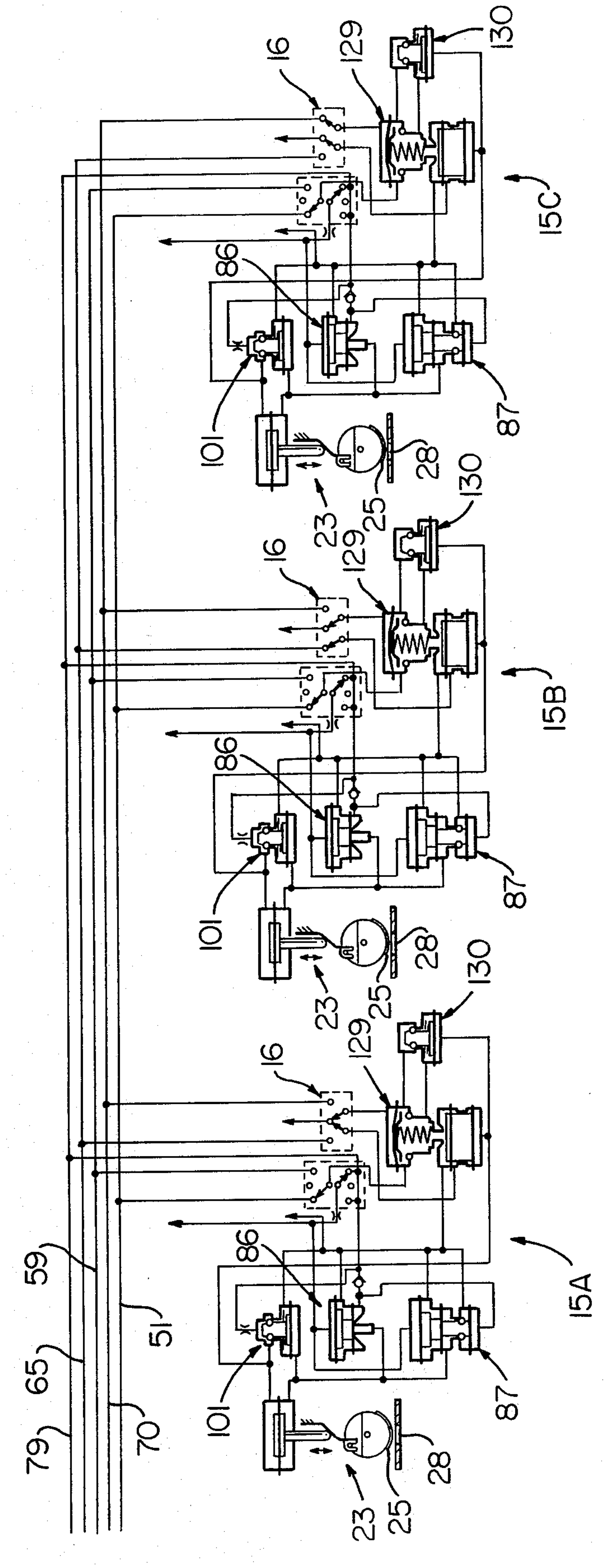
FIG. 2 is a schematic view illustrating in more detail how three of the individual safety control systems of this invention are utilized in the main control system of FIG. 1.

While the various features of this invention are hereinafter described and illustrated as being particularly adapted to provide a particular control system for controlling the operation of an engine, it is to be understood that the various features of this invention can be utilized singly or in any combination thereof to provide safety control systems for other devices as desired.

Therefore, this invention is not to be limited to only the embodiment illustrated in the drawings, because the drawings are merely utilized to illustrate one of the wide varieties of uses of this invention.

Referring now to FIG. 1, the control system of this invention is generally indicated by the reference numeral 10 and comprises a control system for process machinery, the process machinery in FIG. 1 being an engine 11 that is adapted to be supplied fuel from a fuel source 12 through a pneumatically operated valve 13 when the valve 13 has fluid pressure applied thereto from a fluid pressure source 14 by the control system 10 in a manner hereinafter described.

The main control system 10 includes a plurality of individual safety control systems of this invention each being generally indicated by the reference numeral 15 in FIGS. 1–7 with each safety control system 15 being adapted to monitor a certain variable of the process machinery 11 during the start-up and running of the process machinery 11 as will be apparent hereinafter.

In general, since there are many different types of variables of process machinery and the like that can be monitored by a safety system and such variables have been classified according to their condition at start-up.

Five such classifications are class A variables, class B variables, class C variables, alarm variables and position variables.

Class A variables are variables that are normally safe when process machinery is not running. An example would be engine coolant temperature. Accordingly, a sensor can be set to shutdown the engine if coolant temperature gets too high and would be connected by a signal pressure to a class A indicator. If coolant temperature gets too high, the sensor will vent the signal pressure causing the class A indicator to initiate a shutdown.

Class B variables are variables that are normally unsafe when the process machinery is not running. These variables must be locked out or by-passed to allow engine start-up and are of such nature that a time period is presecribed during which they must become safe in order to prevent a shutdown. An example is engine oil pressure. A sensor set to shut down the engine if oil pressure gets too low would be connected by signal pressure to a class B indicator, If the oil pressure gets too low the sensor vents signal pressure causing the class B indicator to initiate a shutdown. However, there is no oil pressure when the engine is not running, so a class B indicator is distinguished by incorporating a valve or relay which is controlled by a timer to lock out the shutdown circuit for a predetermined amount of time, allowing the engine to be started.

Class C variables are those that are normally unsafe when the process machinery is not running. These variables must be locked out to allow engine start-up but are of such a nature that a time period is not prescribed for this lock out. These functions are locked out until they become safe. Once they become safe, they are capable of initiating a shutdown. An example would be engine under-speed. A sensor set to shutdown the engine if RPM gets too low would be connected by a signal pressure to a class C indicator. If engine RPM get too low, the sensor vents the signal pressure causing the class C indicator to initiate a shutdown. However, the engine is under speed when it is not running so a class C indicator is distinguished by incorporating a valve or relay (which is controlled by a separate valve or relay and signal pressure) to lock out the shutdown circuit until engine is started and operating with a speed that the speed sensor determines is safe.

Alarm variables are those variables that require immediate attention upon becoming unsafe but do not require shutting down the process machinery to correct. An example would be coolant level. A sensor set to sound an alarm if coolant level gets too low is connected by signal pressure to an Alarm indicator. If the coolant level gets too low, the sensor vents signal pressure causing the Alarm indicator to sound an alarm horn. Alarm indicators are basically the same as class C indicators except they are used to sound an alarm instead of initiating a shutdown.

Position variables indicators monitor position and condition of the variables but do not initiate further action such as shutdown or alarm. An example would be a valve position, opened or closed.

Each system 15 of this invention is identical to the other systems 15 of this invention and each system 15 can be selectively changed by merely setting a selector means 16 thereof to one of five settings thereof corresponding to the aforementioned five types of variables to monitor such type of variable for the control system 10 or for other control systems in a manner hereinafter described.

However, for purposes of illustration, it can be seen in FIG. 1 that the particular system 15A is set for measuring a class A variable with its sensor 17 set to shutdown the engine 11 if the coolant temperature gets too high. The system 15 particularly indicated by the reference numeral 15B has been set so that its sensor 18 will monitor a class B variable and in control system 10, the sensor 18 is sensing the low oil pressure of the engine 11. The system 15 particularly indicated by the reference numeral 15C in FIG. 1 has been set to monitor a class C variable whereby its sensor 19 senses engine underspeed for the engine 11. The system 15 of FIG. 1 that has been particularly indicated by the reference numeral 15D has been set to monitor an Alarm variable as its sensor 20 senses the low level of the coolant of the engine 11. The system 15 in FIG. 1 that has been particularly indicated by the reference numeral 15E has been set to monitor a Position variable and in place of its sensor a valve 21 is provided which is either opened or closed and the system 15E will indicate whether the valve 21 is opened or closed.

Since the structure of each system 15A–15E as utilized in the main control system 10 is identical except for the particular setting of the selector means 15 thereof as will be apparent hereinafter, only the details of the system 15A of FIG. 3 will be described as the other systems 15B–15E will thereafter be fully understandable, particularly when the details of the operations thereof as hereinafter set forth are read.

Figure 3:
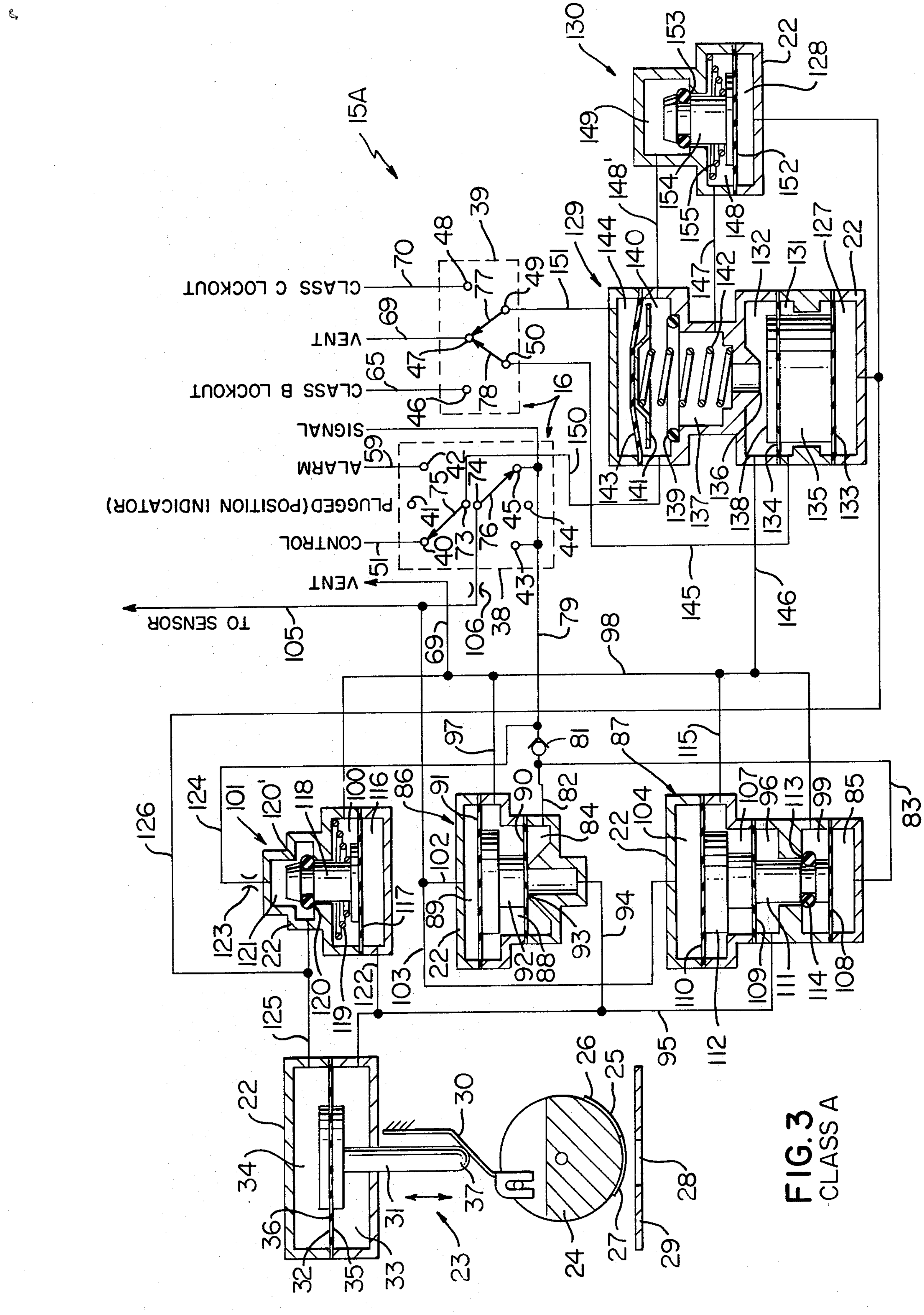
FIG. 3 is an enlarged schematic view illustrating one of the individual safety control systems of this invention with such system being set for monitoring a class A variable.

Accordingly, reference is now made to FIG. 3 wherein the system 15A includes a plurality of individual housing means fluidly interconnected together by conduit means or includes a single housing means with the various parts thereof being interconnected together by internal passage means of the housing means. Thus, whether the system 15A includes a plurality of individual housings or a single housing, the housing means for all the parts thereof will be designated by the reference numeral 22 and the means for fluidly connecting together these parts of the housing means 22 can either be internal passages or conduits as desired.

The system 15A includes a pneumatically operated indicator generally indicated by the reference numeral 23 and comprises a rotatable member 24 having flag means 25 thereon that is divided into a green portion 26 and a red portion 27, the green portion 26 or the red portion 27 being viewable through a window 28 in a plate 29 depending upon the position of the rotatable member 24. A spring 30 tends to maintain the red portion 27 of the flag 25 viewable at the window 28 and is so permitted to maintain the red portion 27 at the window 28 when an actuator plunger 31 is pneumatically moved upwardly by a flexible diaphragm 32 carrying the same and cooperating with the housing means 22 to define two compartments 33 and 34 respectively disposed on opposite sides 35 and 36 of the flexible diaphragm 32.

However, when the stem 31 is driven downwardly in FIG. 3, the end 37 of the stem 31 operates on the spring 30 to cause rotation of the rotatable member 24 so that the green portion 36 of the flag means 25 thereof will now be viewable at the opening 28 and will remain viewable at the window 28 as long as the flexible diaphragm 32 is in a down condition as will be apparent hereinafter.

When the red portion 27 of the flag means 25 of the indicator 23 is viewable at the window 28, such red indication indictes an unsafe condition of the variable being monitored by the system 15A. Conversely, as long as the green portion 26 of the flag means 25 of indicator 23 is being viewable at the window 28, such green indication at the window 28 indicates that the condition being monitored by the system 15A is in a safe condition thereof.

The selector means 16 of the system 15A comprises two selector plates 38 and 39 with the selector plate 38 having port means 40, 41, 42, 43, 44, and 45 therein while the plate 39 has port means 46, 47, 48, 49 and 50 therein.

The port 40 of the plate 38 is interconnected to a control passage 51 which in the system 10 of FIG. 1 leads through a one-way check valve 52 to a pair of branch passages 53 and 54, the branch passage 53 leading to a pneumatically operated class C lockout relay 55 while the branch passage 54 leads ot a passage 56 that interconnects through a one-way check valve 57 to a passage 58 that leads to the pneumatically operated fuel valve 13.

The ports 41 and 44 of the plate 38 are plugged for a purpose hereinafter described. The port 42 of the plate is interconnected to a passage 59 which in the system 10 of FIG. 1 leads to a pneumatically operated alarm control relay 60 which is adapted to direct fluid pressure from the source 14 by means of interconnecting passages 61, 62 and 63 to an alarm horn 64 to sound the same whenever fluid pressure in the passage 59 is vented as will be apparent hereinafter.

The port 46 of the selector plate 39 is interconnected to a passage 65 which in the system 10 of FIG. 1 leads to a class B pneumatically operated timer relay 66 which when initially connected to the pressure source 14 by a conduit means 67 will disconnect the passage 65 from a pressure source passage 68 and will interconnect the passage 68 that joins to the pressure supply line 63.

The port 47 in the plate 39 is interconnected to a passage 69 that is vented to the atmosphere as illustrated in FIG. 1.

The port 48 of the selector plate 39 is interconnected to a passage 70 which in the system 10 of FIG. 1 is blocked by a one-way check valve 71 from a passage 72 that leads to the class C lockout relay 55 that is adapted to interconnect the passage 72 to the supply pressure passage 62 whenever the class C lockout relay 55 is not receiving pressure through the line 53 thereof. However, when the class C lockout relay 55 is receiving pressure in the line 53 thereof, the class C lockout relay 55 interconnects the passage 72 to vent as will be apparent hereinafter.

The selector plate 38 includes two other ports 73 and 74 respectively interconnected to manually adjustable fluid switching members 75 and 76 which respectively are adapted to interconnect their ports 73 and 74 with one of the outer ports 40–42 and 43–45 as illustrated.

Similarly, the two ports 49 and 50 of the selector plate 39 are interconnected to manually adjustable fluid transmitting members 77 and 78, the switching member 78 being adapted to either interconnect the port 50 with the port 47 or to the port 47 while the switching member 77 is adapted to interconnect the port 49 either with the port 47 or with the port 48.

The ports 43 and 45 of the selector plate 38 are fluidly interconnected to a signal pressure passage 79 which in the system 10 of FIG. 1 not only is fluidly interconnected to the passage 67, but is also blocked by a one-way check valve 80 from the passage 56 that leads to the pneumatically operated fuel supply valve 13 for a purpose hereinafter described.

In the system 15A of FIG. 3, the signal pressure passage 79 leads through a one-way check valve 81 to two branch passages 82 and 83 which are respectively fluidly interconnected to chambers 84 and 85 of the valve units 86 and 87.

The valve unit 86 is divided into chambers 84, 88 and 89 by two flexible diaphragms 90 and 91 carried by the housing means 22 and being separated from each other by a movable spacer 92. The chamber 84 of the valve unit 86 leads to a valve seat 93 that is adapted to be opened and closed by the flexible diaphragm 90, the valve seat 93 being interconnected to a passage 94 that is interconnected to a passage 95 that leads from the chamber 33 of the pneumatically operated indicator 23 to a chamber 96 of the valve unit 87.

The chamber 88 of the valve unit 86 is interconnected by a passage 97 to a passage 98 that interconnects a chamber 99 of the valve unit 87 to a chamber 100 of another valve unit 101 of the system 15A.

The chamber 89 of the valve unit 86 is interconnected by a passage 102 to a passage 103 that interconnects a chamber 104 of the valve unit 87 to a passage 105 that leads to the particular sensor of the system 15A, which in the system 10 of FIG. 1 is the coolant high temperature sensor 17 for a purpose hereinafter described, whereby the passage 105 is a sensor passage.

The sensor passage 105 of the system 15A also is interconnected by a restrictor 106 to the port 74 of the selector plate 38.

The valve unit 87 is divided into the chambers 85, 99, 96, 107 and 104 by flexible diaphragms 108, 109, and 110 carried by the housing means 22 and being respectively spaced from each other by movable spacers 111 and 112.

The housing means 22 for the valve unit 87 includes a valve seat 113 that is adapted to interconnect the chambers 99 and 96 together when the valve seat 113 is opened by the valve member 114 being carried on the spacer 111 and being moved away from the valve seat 113.

The chamber 107 of the valve unit 87 is interconnected by a passage 115 to the passage 98.

The valve unit 101 is divided into two chambers 100 and 116 by a flexible diaphragm 117 carried by the housing means 22, the flexible diaphragm 117 controlling the movement of a valve member 118 that is normally biased by a compression spring 119 to close a valve seat 120 that leads from the chamber 100 to another chamber 121 of the valve unit 101.

The chamber 116 of the valve unit 101 is interconnected by a passage 122 to the passage 95 while the chamber 121 of the valve unit 101 is interconnected through a restrictor 123 to a passage 124 that interconnects to the signal pressure passage 79 upstream of the one-way check valve 81.

The chamber 121 of the valve unit 101 is also interconnected to a passage 124 that leads to the chamber 34 of the pneumatically operated indicator 23, the passage 125 being interconnected to a passage 126 that is respectively fluidly interconnected to chambers 127 and 128 of two other valve units 129 and 130 of the system 15A.

The housing means 22 of the valve unit 101 has another valve seat 120' adapted to be opened and closed by the valve member 118, the valve seat 120' being spaced from the valve seat 120 whereby when the valve member 118 is closed against the valve seat 120, the passage 125 is interconnected to the passage 124 through the open valve seat 120'. However, when the valve seat 120' is closed by the valve member 118, the passage 125 is interconnected to the passage 98 through the open valve seat 120 while the passage 124 is blocked by the closed valve seat 120'.

The valve unit 129 is divided into chambers 127, 131, and 132 by a flexible diaphragms 133 and 134 that are carried by the housing means 22 and are separated by a movable spacer 135.

The valve unit 129 has a valve seat 136 for fluidly interconnecting the chamber 132 to a chamber 137 thereof, the valve seat 136 being adapted to be opened and closed by a resilient valve member 138 carried by the flexible diaphragm 134.

The valve unit 129 has a resilient valve seat 139 that is adapted to fluidly interconnect the chamber 137 thereof with another chamber 140, the valve seat 139 being adapted to be opened and closed by a hat-shaped valve member 141 normally urged to an open position by a compression spring 142 and being controlled by a flexible diaphragm 143 that separates the chamber 140 from another chamber 144 of the valve unit 129.

The chamber 131 of the valve unit 129 is fluidly interconnected by a passage 145 to the port 50 of the selector plate 39.

The chamber 132 of the valve unit 129 is interconnected by a passage 146 to the passage 98, the passage 98 in turn being interconnected to the vent passage 69.

The chamber 137 of the valve unit 129 is interconnected by a passage 147 to a chamber 148 of the valve unit 130.

The chamber 140 of the valve unit 129 is interconnected by a passage 148' to a chamber 149 of the valve unit 130, the chamber 140 of the valve unit 129 also being interconnected by the passage 150 to the port 73 of the selector plate 38.

The chamber 144 of the valve unit 129 is interconnected by a passage 151 to the port 49 of the selector plate 39.

The valve unit 130 has the chamber 128 thereof separated from the chamber 148 thereof by a flexible diaphragm 152 carried by the housing means 22.

The chamber 148 of the valve unit 130 is separated from the chamber 149 thereof by the valve seat 153 adapted to be opened and closed by a valve member 154 normally urged to the closed position thereof by a compression spring 155 whereby the flexible diaphragm 152 can open the valve seat 153 as the same controls the movement of the valve member 154 as will be apparent hereinafter.

Thus it can be seen that each system 15 of this invention is made from the pneumatically operated indicator 23, valve units 86, 87, 101, 129 and 130 and the selector means 16, whereby only the selector means 16 need be adjusted to cause the particular system 15 to perform a safety control function for monitoring one of five variables of process machinery, namely a class A variable, a class B variable, a class C variable, an Alarm variable, and a Position variable.

The operation of the system 15A of FIG. 3 as utilized in system 10 of FIG. 1 will now be described.

When the operator desires to start the engine 11 of FIG. 1, the operator pushes inwardly on a button 156 of a reset start relay 157 causing it to close so that air from the supply 14 will immediately flow into the signal passage 79, by means of the passage 67 being interconnected through the relay 157 to the supply pressure passage 61, and also into the control pressure passage 51 by means of interconnecting passage 158 that leads from the restrictor 159 of the relay 157 and is thereby interconnected to the passage 67.

Since the selector means 16 of the system 15A has been set for monitoring a class A variable, the adjustable members 75, 76, 77 and 78 of the selector plates 38 and 39 respectively have been set to interconnect the control port 40 to the port 73, the supply port 45 to the port 74, and the vent port 47 respectively to the ports 49 and 50 as illustrated in FIG. 3.

When supply pressure is applied into the signal passage 79 of system 15A of FIG. 3, it immediately enters through the one-way check valve 81 and branch passage 82 and 83 into the chamber 85 of the valve unit 87 and the chamber 84 of the valve unit 86. The supply pressure in chamber 85 of the valve unit 87 acts on the diaphragm 108 and valve stem 111 to close the valve member 114 against the valve seat 113. The supply pressure in chamber 84 of the valve unit 86 acts on the diaphragm 90 to open the valve seat 93 and with the valve seat 93 open, supply pressure flows into chamber 116 of the valve unit 101 by means of passages 94, 95 and 122, flows into the chamber 33 of the pneumatically operated indicator 23 by means of passages 94, 95 and 122 and flows into chamber 96 of the valve unit 87 by means of passages 94, 95, and 122.

The pressure in chamber 116 of the valve unit 101 acts on the diaphragm 117 to close the valve member 118 against the valve seat 120' and open the valve seat 120 in opposition to force of the compression spring 119 and, thus, thereby keeping pressure from entering chamber 34 of the pneumatically operated indicator 23 because of the signal pressure passage 79 being interconnected to the chamber 121 of the valve unit 101 by the passage 124. The closing of the valve seat 120' by the valve member 118 also will prevent pressure from entering the chamber 127 of the valve unit 129 from the signal passage 79 by means of the passage 126 being effectively disconnected from the pressure side of the chamber 121 of the valve unit 101.

Pressure now entering chamber 33 of the pneumatically operated indicator 23 causes the diaphragm 32 to move upwardly in FIG. 3 and raise the stem 31 so that the spring 30 causes the red portion 27 of the flag means 25 of the rotatable member 24 to be exposed at the window 28 and temporarily show an unsafe condition of the coolant high temperature for the engine 11.

However, at the same time supply pressure is also entering line 105 to the sensor 17 of FIG. 1 by means of the signal passage 79 being interconnected by the adjustable member 76 of the selector means 16 to the orifice 106 and, thus, to the sensor passage 105. If the sensor 17 is sensing a safe condition of the engine 11, pressure will begin to build up in passage 105 and, thus, in chamber 89 of the valve unit 86 by means of passages 103 and 102 interconnecting the sensor passage 105 thereto. Also pressure will build up in chamber 104 of the valve unit 87 by means of the passage 103 interconnecting the chamber 104 to the sensor passage 105.

As pressure builds up in chamber 89 of the valve unit 86, it acts on the diaphragm 91 and movable spacer 92 against the supply pressure acting on the smaller diaphragm 90 in chamber 84 thereof and closes the diaphragm 90 against the valve seat 93.

As pressure builds up in chamber 104 of the valve unit 87, it acts on diaphragm 110 and movable spacer 112 against the supply pressure acting on the diaphragms 109 and 108 and thereby causes the valve stem 111 to open the valve member 114 away from the valve seat 113 with a snap action and thereby vents the pressure in chamber 116 of the valve unit 101 and chamber 33 of the pneumatically operated indicator 23 because the passage 95 is now interconnected through the opened valve seat 113 of the valve unit 87 to the passage 98 that leads to the vent passage 69.

The venting of the pressure in the chamber 116 of the valve unit 101 allows the spring 119 to open the valve member 118 away from the valve seat 120 and to close against the valve seat 120' whereby pressure from the line 124 now enters the chamber 121 and by means of passage 125 enters the chamber 34 of the pneumatically operated indicator 23 and by means of passage 126 enters the chamber 127 of the valve unit 129.

The pressure now in chamber 34 of the pneumatically operated indicator 23 acts on the diaphragm 32 to push stem 31 downwardly and through its action on the spring 30 rotates the rotatable member 24 to position the green portion 26 of the flag means 25 thereof at the window 28 to thereby show a safe condition for the variable of the engine 11 that the system 15A is monitoring.

Also, the pressure now existing in chamber 127 of the valve unit 129 acts on the diaphragm 133 and through spacer 135 and diaphragm 134 moves and holds the resilient valve member 138 against the valve seat 136. With the valve seat 136 now disconnected from the interconnecting venting passages 146, 98 and 69, pressure can now build up in the control passage 51 through the orifice 159 of the relay 157 supplying pressure to the line 158 because the line 51 will no longer be vented through the valve seat 136 of the valve unit 129 by means of selector member 75, passage 150, chamber 140, open valve seat 139 and chamber 137 of the valve unit 129.

Once pressure has built up in the control passage 51, it acts on a diaphragm of the reset start relay 157 to hold it in an open position whereby the operator can now release the button 156 and the relay 157 will remain in its closed condition of interconnecting the supply pressure 14 to the lines 67 and 158.

This starting action for the engine 11 all takes place in at most a few seconds and the system is now operational and safe as far as the control system 15A is concerned as fuel is adapted to be directed to the engine 11 from the fuel source 12 because the pressure in the control line 51 can pass through the one-way check valve 52 and passage 54 to operate the class C lockout relay 55 to interconnect the supply pressure passage 62 to the passage 58 by means of passage 162 where pressure is directed to the fuel valve 13 to operate the same to interconnect the fuel source 12 to the engine 11. Thus, fuel is continuously supplied to the engine 11 as long as pressure remains in the control line 51.

During the running of the engine 11 should the monitored variable of the system 15A become unsafe, the sensor 17 will vent pressure in the sensor line 105 and thereby cause venting of the chamber 89 of the valve unit 86 and the chamber 104 of the valve unit 87 by means of interconnecting passages 103 and 102. As pressure drops in the chamber 104 of the valve unit 87, the supply pressure acting on diaphragm 108 will cause the valve member 114 to close the valve seat 113 and the supply pressure acting on diaphragm 90 of the valve unit 86 will cause valve seat 93 to open with a snap action and thus allow supply pressure from the signal passage 79 to flow from the open valve seat 93 and interconnecting passages 94 and 95 into the chamber 116 of the valve unit 101 and the chamber 33 of the pneumatically operated indicator 23.

With supply pressure now in the chamber 116 of the valve unit 101, the same acts on the diaphragm 117 to cause the valve member 118 to close the valve seat 120' and open the valve seat 120 thereby dumping pressure from the chamber 34 of the pneumatically operated indicator 23 and the pressure in chamber 127 of the valve unit 129 through the open valve seat 120 to the vent line 69 by means of passage 98.

The pressure now in chamber 33 of the pneumatically operated indicator 23 moves the diaphragm 36 upwardly and thereby causes the spring 30 to move the rotatable member 24 to the position illustrated in FIG. 3 so that the red portion 27 of the flag means 25 is now present at the window 28 to indicate an unsafe condition.

Also when pressure in the chamber 127 of the valve unit 129 is vented in the above manner, valve member 138 opens under the force of the pressure in the chamber 137 acting against the valve member 138 through the valve seat 136 so that with the valve seat 136 now open, pressure in the control line 51 is vented through selector member 75, passage 150, chambers 140 and 137, open valve seat 136, chamber 132 and passages 146 and 98 to vent passage 69 to thereby cause a shutdown of the engine 11 because the venting of the control line 51 causes the pneumatically operated class C lockout relay to return to a position to disconnect the supply passage 62 from the passage 162 and interconnect the passage 162 to vent whereby the now vented fuel valve 13 returns to its normally closed position and thereby disconnects the fuel source 12 from the engine 11 to complete the shutdown thereof.

The mean effective areas of the valve units 86 and 87 are so calibrated that on falling sensor pressure in the sensor passage 105, the valve seat 113 closes before the valve seat 93 opens and on a rising pressure in the sensor passage 105, the valve seat 93 closes before the valve seat 113 opens.

In this manner, it can be seen that the control system 15A monitors a class A variable of the process machinery 11 which is normally safe when the process machinery is not running and should the variable become unsafe during the running of the process machinery, the system 15A will indicate an unsafe condition thereof by the pneumatically operated indicator 23 showing a red portion 27 of the flag means 25 at the window 28 as well as open the valve seat 136 to vent the control pressure passage 51 and thereby cause a shutdown of the process machinery. Of course, once the cause of the shutdown has been corrected, the process machinery 11 can be restarted in the manner previously described.

Therefore, it can be seen that in the plurality of systems 15 of this invention for the main control system 10 of FIG. 1, each class A variable of the process machinery 11 is monitored in the same way as the class A variable system 15A of FIG. 3 previously described.

Figure 4:
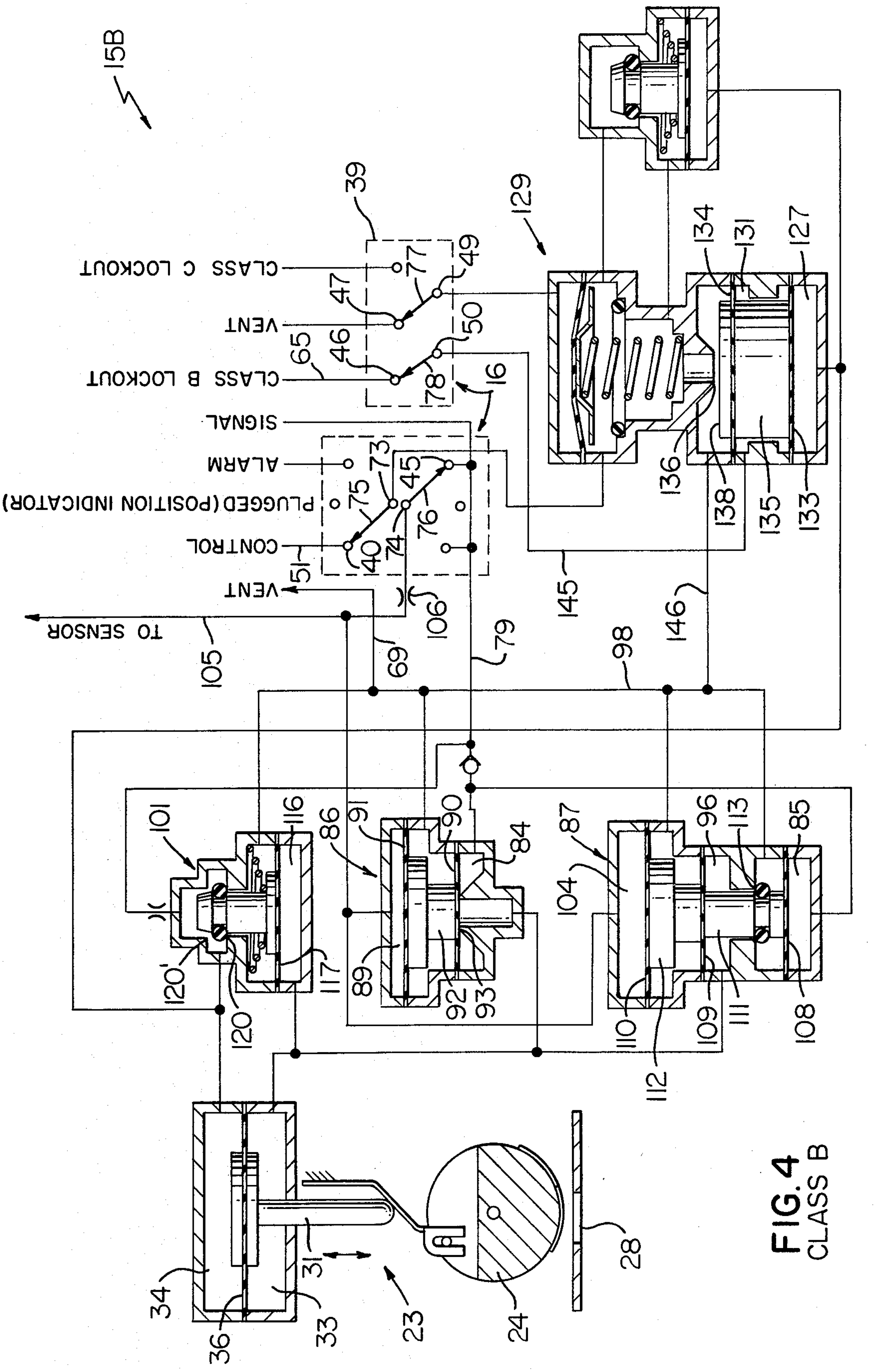
FIG. 4 is a view similar to FIG. 3 and illustrates the system set for monitoring a class B variable.

Similarly, each class B variable of the engine 11 being monitored by the respective systems 15 of this invention operates in the manner illustrated in FIG. 4 and now to be described.

The system 15B of FIG. 4 has the movable selector parts 75 and 76 of the selector means 16 respectively interconnecting the ports 73 and 74 to the control port 40 and to the port 45 in the same manner as the class A system 15A of FIG. 3. However, the movable parts 77 and 78 for the selector plate 39 are set to respectively interconnect their ports 49 and 50 with the vent port 47 and the class B lockout port 46.

Generally, the system 15B for a class B variable operates in the same manner as the system 15A for a class A variable except that the system 15B utilizes the use of the lockout lower portion of the valve unit 129 because class B variables are variables that are normally unsafe when the engine is not running and to start the engine, these variables must be locked out for a predetermined amount of time until the engine is running and they have a chance to become safe, such as the low oil pressure of the engine 11.

Thus, when attempting a start-up of the system 10, the operator will, upon depressing the button 156 of the start-up relay 157, direct pressure from the pressure source 14 not only through the lines 67 and 158 to the signal passage 79 and control passage 51 in the manner previously described, but will also direct pressure through the passage 67 to pneumatically initiate and activate the class B timer relay 66 so that pressure from the source 14 in passage 62, passage 63 and passage 68 will be interconnected to the class B lockout passage 65 through the class B timer relay 66. With pressure in the class B lockout passage 65, the same is directed by the movable part 78 of the selector means 16 through the passage 145 and into chamber 131 of the lower portion of the valve unit 129 to act on the diaphragm 134 to move the same upwardly and close the valve seat 136 with the valve member 138.

With the valve seat 136 of the valve unit 129 now closed, pressure can build up in the control passage 51 because the same is no longer vented through the valve seat 136 as the valve seat 136 is closed from the interconnecting vent passages 146, 98 and 69.

With pressure now built up in the control passage 51, the same flows through the one-way check valve 52 to the pneumatically operated class C lockout relay 55 to operate the same in a manner to have the fuel control valve 13 interconnect the fuel source 12 to the engine 11 as described in connection with FIG. 3 and thereby cause the engine 11 to begin to run.

Once the engine 11 is started and the class B variable of the low lube pressure has become safe, a chain of events occurs in the system 15B as described in connection with the class A operation of FIG. 3 to cause chamber 127 of the valve unit 129 to be pressurized.

In particular, when supply pressure is applied to sensor passageway 79, it immediately enters the chamber 85 of the valve unit 87 and the chamber 84 of the valve unit 86. The supply pressure in chamber 85 acts on the diaphragm 108 and the valve stem 111 to close the valve seat 113. The supply pressure in the chamber 84 of the valve unit 86 acts on the diaphragm 90 to open the valve seat 93. With the valve seat 93 open, supply pressure flows into the chamber 33 of the indicator 23, the chamber 116 of the valve unit 101 and the chamber 96 of the valve unit 87. The pressure in the chamber 116 of the valve unit 101 acts on the diaphragm 117 to close the valve seat 120 and open the valve seat 120′, thus keeping the supply pressure from entering the chamber 34 of the indicator 23 and the chamber 127 of the valve unit 129. Pressure entering chamber 33 of the indicator 23 causes the stem 31 to raise and thereby show a red flag at the window 28.

At the same time, supply pressure is also entering the sensor line 105 to the sensor 18 through the orifice 106. If the sensor 18 subsequently senses a safe condition of the variable being monitored thereby, pressure will begin to build up in the sensor passageway 105 and in the chamber 89 of the valve unit 86 and the chamber 104 of the valve unit 87. As pressure builds up in the chamber 89 of the valve unit 86, it acts on the diaphragm 110 and the spacer 112 (against supply pressure acting on the diaphragms 109 and 108) and the stem 111 to open the valve seat 113 with a snap action so as to vent pressure in the chamber 116 of the valve unit 101 and the chamber 33 of the indicator 23. The venting of pressure in the chamber 116 of the valve unit 101 allows the valve seat 120′ to open and the valve seat 120 to close which allows pressure to enter the chamber 34 of the indicator 23 and the chamber 127 of the valve unit 129. The pressure in the chamber 34 of the indicator 23 acts on the diaphragm 36 to push the stem 31 downwardly and make a green flag be exposed at the window 28.

At this time, the pressure in the chamber 127 acting on the diaphragm 133 is opposed by the pressure in the chamber 131 so that the diaphragm 133 has not moved upwardly but the valve member 138 is still maintaining the valve seat 136 closed because of the previously described pressure being provided in the chamber 131 of the valve unit 129 by the activated class B timer 66 of FIG. 1.

When the predetermined lockout time has expired, the class B timer 66 deactivates to vent the class B lockout passage 65 and disconnect the passage 68 therefrom. This vents the pressure from the chamber 131 of the valve unit 129. As chamber 131 of the valve unit 129 depressurizes, the pressure in chamber 127 begins acting on the diaphragm 133 and pushing spacer 135 upwardly against the diaphragm 134 and the resilient valve member 138 to hold the valve seat 136 closed whereby the class B system of FIG. 4 is now operational and safe.

Of course, during the predetermined time period of operation of the class B timer 66, should the sensor 18 never sense a safe condition, pressure will never build in the sensor passage 105 of the system 15B so that no pressure will be provided in the chamber 127 of the valve unit 129. Thus, when the class B timer 66 vents the class B lockout passage 65, the valve seat 136 will open and thereby cause a shutdown of the engine by venting the control passage 51 through the opened valve seat 136 and cause the indicator 23 to indicate a red condition at the window 28 in the same way as the class A operation of FIG. 3 previously described as well as in the same way if the operational and safe system of FIG. 4 subsequently becomes unsafe.

In particular, should the monitored variable being sensed by the sensor 18 become unsafe, the sensor 18 will vent the pressure in the sensor passageway 105 and, thus, vent the chamber 89 of the valve unit 86 and the chamber 104 of the valve unit 87. As pressure drops in the chamber 104 of the valve unit 87, the supply pressure acting on diaphragm 108 will cause the valve seat 113 to close. As the pressure drops in the chamber 89 of the valve unit 87, the supply pressure acting on the diaphragm 90 will cause the valve seat 93 to open with a snap action allowing supply pressure to flow into the chamber 116 of the valve unit 101 and the chamber 33 of the indicator 23.

Pressure in the chamber 116 of the valve unit 101 causes the valve seat 120′ to close and the valve seat 120 to open dumping pressure from the chamber 34 of the indicator 23 and the chamber 127 of the valve unit 129.

Pressure now in the chamber 33 of the indicator 23 causes the rotatable member 24 to show a red flag at the window 28 and when pressure in the chamber 127 of the valve unit 129 is dumped, the valve seat 136 is opened which dumps pressure in the control passageway 51 and thereby causes a shutdown of the engine 11 as previously described.

Thus, it can be seen that in a system 15 of this invention that has been set for monitoring a class B variable, the valve seat 136 of the valve unit 129 is held closed for a predetermined time from the initial start-up for the class B variable to become safe as the same is normally unsafe at start-up.

The operation of the system 15 of this invention when utilized to monitor a class C variable of process machinery will now be described.

Figure 5:
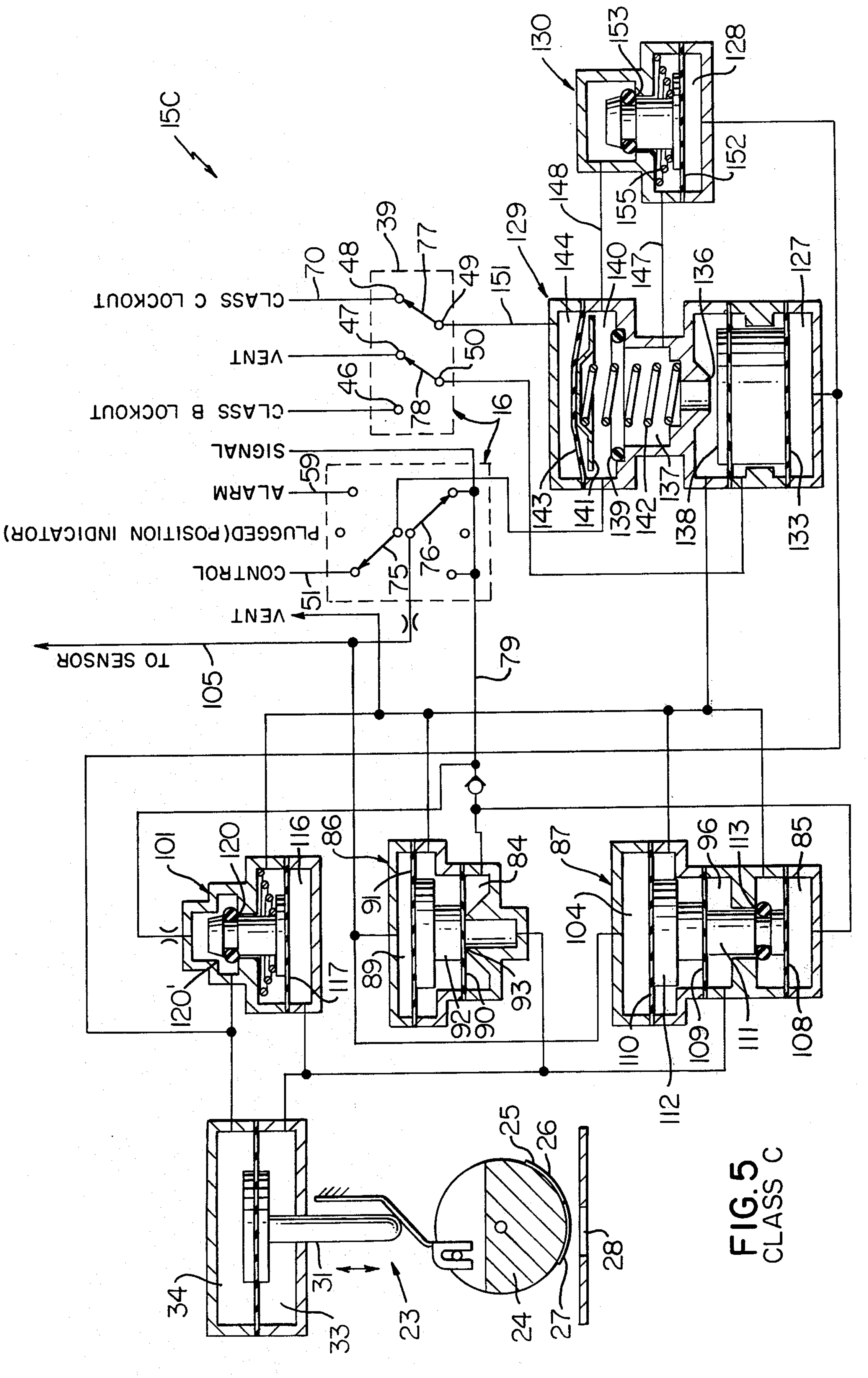
FIG. 5 is a view similar to FIG. 3 and illustrates the system set for monitoring a class C variable.

As illustrated in FIG. 5, the system 15C has the movable selector members 75 and 76 set in the same position as for the class A and class B operation previously described while the movable members 77 and 78 respectively interconnect their ports 49 and 50 to ports 48 and 47 of the selector plate 39.

As previously stated, a class C system 15 operates in the same manner as a class A system 15 except that it incorporates the use of a self unlocking lockout portion of the valve unit 129 on start-up as class C variables are those that are normally unsafe when the engine is not running and do not require a certain time period to become safe. Thus, to start the engine, these class C variables must be locked out until the engine 11 is running and are determined safe.

Thus, when the operator attempts a start-up, pressure will be directed into the class C lockout passage 70 because the same is interconnected to the passage 62 by the unactivated class C lockout relay 55, passage 72 and one-way check valve 71.

With pressure now entering into the class C lockout passage 70, such pressure will flow into the chamber 144 of the valve unit 129 by means of the selector member 77 and passage 151 and act on diaphragm 143 to press the valve disc 141 against the O-ring valve seat 139 to close the valve seat 139 so that pressure in the control passageway 51 can now build up as the same is no longer vented through the valve seat 136 of the valve unit 129 as the upstream valve seat 139 is now closed.

Thus, with the control passage 51 now being pressurized, the pressure in passage 51 acts through the oneway check valve 52 of FIG. 1 and passage 53 to pneumatically operate the class C lockout 55 to cause the same to disconnect the supply passage 62 from the passage 72 and interconnect the passage 72 to vent and, thus, the chamber 144 of the valve unit 129 to vent.

However, when the chamber 144 of the valve unit 129 is vented, the valve seat 136 is open and there is no pressure acting under valve disc 141 so that the pressure in the chamber 140 of the valve unit 129 acting on top of the valve disc 141 holds the valve disc 141 on the valve seat 139 against the force of the compression spring 142.

Thus, the buildup of pressure in the control passage 51 allows the engine 11 to be started as the passage is interconnected through the one-way check valve 52 and passage 53 to the class C lockout relay 55 which supplies pressure through the passage 162 to the fuel control valve 13 which interconnects the fuel source 12 to the engine 11 in the manner previously described.

Once the engine 11 is started, and the particular class C variable of the system 15C has become same, a chain of events occurs in the system 15C as described in connection with the operation of the class A system 15A of FIG. 3, to cause the chamber 127 of the valve unit 129 to be pressurized and the chamber 128 of the valve unit 130 to be pressurized.

In particular, when supply pressure is applied to signal passage 79, it immediately enters the chamber 85 of the valve unit 87 and the chamber 84 of the valve unit 86. The supply pressure in the chamber 85 of the valve unit 87 acts on the diaphragm 108 and the valve stem 111 to close the valve seat 113. The supply pressure in the chamber 84 of the valve unit 86 acts on the diaphragm 90 to open the valve seat 93 so that the supply pressure will flow from the open valve seat 93 into the chamber 116 of the valve unit 101, the chamber 33 of the indicator 23 and the chamber 96 of the valve unit 87. The pressure in the chamber 116 of the valve unit 101 acts on the diaphragm 117 to close the valve seat 120' and open the valve seat 120 thus keeping pressure from entering the chamber 34 of the indicator 23 and the chamber 127 of the valve unit 129. Pressure entering the chamber 33 of the indicator 23 causes the rotatable member 24 to show a red flag at window 28. At the same time supply pressure is also entering the sensor passage 105 by the selector member 76 and when the sensor 19 is sensing a safe condition, pressure will begin to build up in the sensor passage 105 and in the chamber 89 of the valve unit 86 and the chamber 104 of the valve unit 87.

As pressure builds up in the chamber 89 of the valve unit 86, it acts on the diaphragm 91 and the spacer 92 (against the supply pressure acting on the diaphragm 90) to close the valve seat 93. As the pressure builds up in the chamber 104 of the valve unit 87, it acts on the diaphragm 110 and the spacer 112 (against the supply pressure acting on the diaphragms 109 and 108) to open the valve seat 113 with a snap action venting the pressure in chamber 116 of the valve unit 101 and the chamber 33 of the indicator 23. The venting of pressure in the chamber 116 of the valve unit 101 allows the valve seat 120' to open and the valve seat 120 to close which allows pressure to enter the chamber 34 of the indicator 23 and the chamber 127 of the valve unit 129. The pressure in the chamber 34 of the indicator 23 acts on the valve stem 31 to cause the movable member 24 to indicate a green flag 26 at the window 28 and the pressure in the chamber 127 of the valve unit 129 acts on the disphragm 133 to close the valve seat 136 with the valve member 138 as previously described.

With pressure now in the chamber 128 of the valve unit 130, such pressure acts on the diaphragm 152 and moves the same upwardly in opposition to the force of the compression spring 155 to open the valve seat 153. The opening of the valve seat 153 allows pressure from the chamber 140 of the valve unit 129 to flow through passage 145', the open valve seat 153 of the valve unit 130 and the passage 147 into the chamber 137 of the valve unit 129. When the pressure in the chamber 137 of the valve unit 129 equalizes with the pressure in the chamber 140 thereof, there is no pressure differential acting on the mean effective area of the valve disc 141 to hold it on the O-ring valve seat 139 so that the force of the compression spring 142 acts on the valve disc 141 to push it off of the valve seat 139 thereby allowing a clear flow path between the chambers 140 and 137. At this time the class C system 15C is operational and safe.

Thus, it can be seen that until the sensor 19 for the system 15C senses a safe condition, the indicator 23 will show a red flag at the window 28 and the valve member 141 of the valve unit 129 remains on the valve seat 139 permitting the control passage 51 to maintain is pressure and, thus, maintain the engine in continuous operation.

However, after the system 15C is operational as previously described, should the variable being monitored by the sensor 19 of the system 15C become unsafe, a chain of events occurs in the system 15C as described in connection with class A operation of FIG. 3 to cause the indicator 23 to give a red flag and the engine 11 to be shut down.

In particular, should the monitored variable of the sensor 19 become unsafe, the sensor 19 will vent the pressure in the sensor line 105 and thus vent the pressure from the chamber 89 of the valve unit 86 and the chamber 104 of the valve unit 87. As the pressure drops in the chamber 104 of the valve unit 87, the supply pressure acting on the diaphragm 108 will cause the valve seat 113 to close. As the pressure drops in the chamber 89 of the valve unit 86, the supply pressure acting on the diaphragm 90 will cause the valve seat 93 to open with a snap action allowing the supply pressure to flow into the chamber 116 of the valve unit 101 and the chamber 33 of the indicator 23. Pressure in the chamber 116 of the valve unit 101 causes the valve seat 120' to close and the valve seat 120 to open dumping pressure from the chamber 34 of the indicator 23 and pressure from the chamber 127 of the valve unit 129. Pressure now in the chamber 33 of the indicator 23 causes the movable member 24 to show the red flag portion 27 of the flag means 25 at the window 28 to indicate an unsafe condition and when pressure in the chamber 127 of the valve unit 129 is dumped, the valve seat 136 is opened which vents the pressure in the control passage 51 and causes a shutdown of the engine 11 as previously described.

Therefore, it can be seen that in the systems 15 of this invention that are utilized for monitoring class C variables of the process machinery 11, each incorporates the use of a self unlocking lockout valve member arrangement 141, 139 of the valve unit 129 on engine start-up so that the particular class C variable that is normally unsafe when the engine is not running and does not require a certain time period to become safe, will be locked out until the engine 11 is running and may become safe so that thereafter should it become unsafe, the system 15C will cause the indicator 23 to indicate a red flag condition and cause an engine shutdown.

Figure 6:
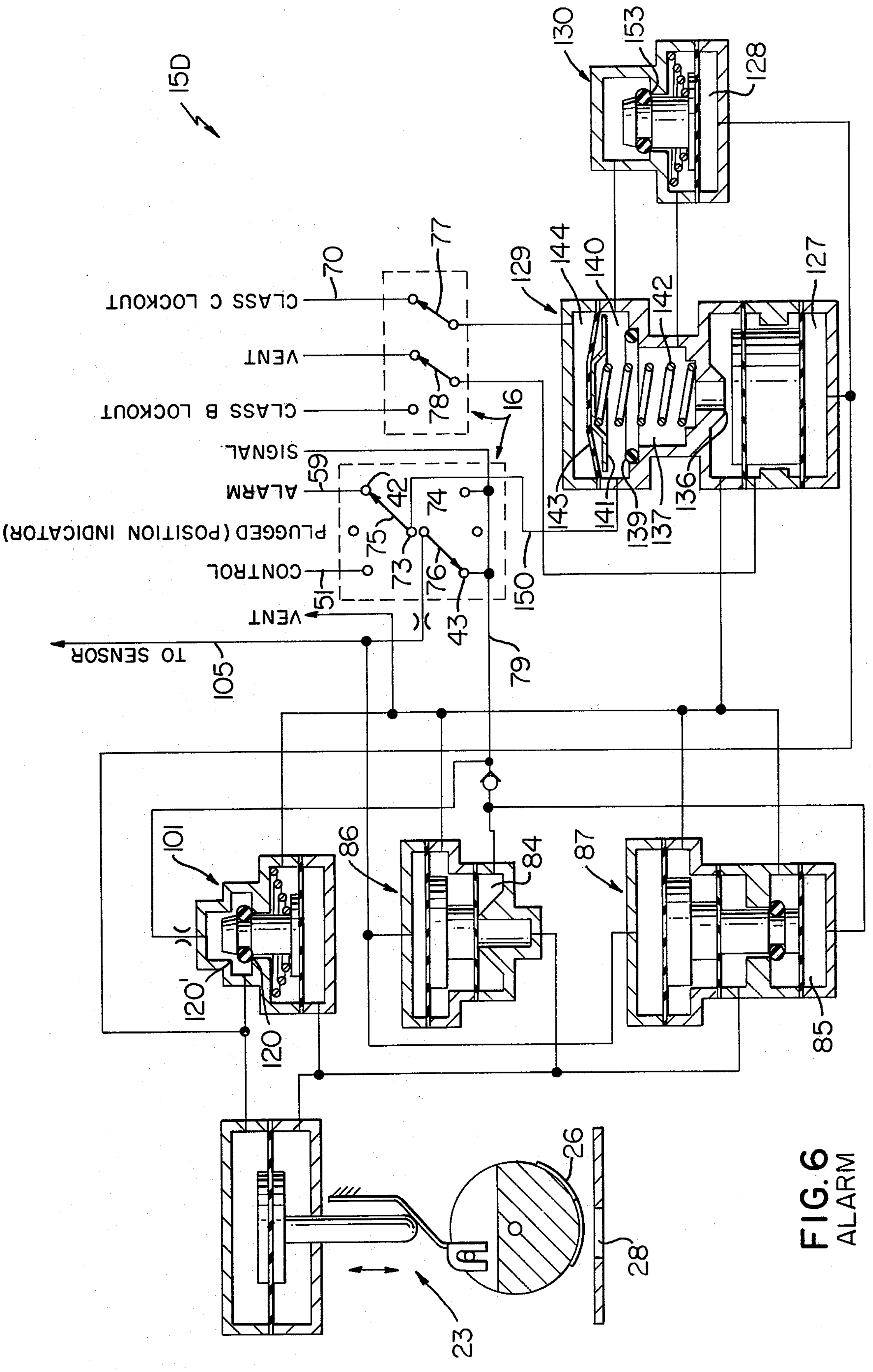
FIG. 6 is a view similar to FIG. 3 and illustrates the system set for monitoring an Alarm variable.

Referring now to FIG. 6, the system 15D is set for an Alarm variable and functions in the same manner as monitoring a class C variable except that the system 15D is used to sound an alarm instead of shutting the engine down because alarm variables are those that can normally be corrected (such as coolant level) without shutting the engine down.

The only difference between a class C setting of the system 15 and an Alarm setting thereof is that the movable selector members 75 and 76 are respectively set to interconnect their ports 73 and 74 respectively to the ports 42 and 43 whereby the chamber 140 of the valve unit 129 is interconnected to the alarm passage 59 by means of the passage 150 and movable member 75 of selector member 16.

Thus, when the operator attempts a start-up, the operator depresses the start button 156 of the relay 157 and, thus, introduces pressure into the control passage 51, signal passage 79 and class C lock out passage 70 in the manner previously described for the system 15C.

Pressure entering into the class C lockout passage 80 will flow into the chamber 144 of the valve unit 129 and act on the diaphragm 143 to press the valve disc 141 closed against the valve seat 139 forming a closed valve seat in advance of the open valve seat 136 so the pressure in the control passage 51 will build up. When the control passage 51 is pressurized, the pressure therein acts on the class C lockout 55 to remove pressure from the class C lockout passage 70 and interconnect the same to vent whereby the chamber 144 of the valve unit 129 is evacuated. However, since the valve seat 139 of the valve unit 129 is opened at this time and there is no pressure under the disc 141, the pressure in chamber 140 acts on top of the valve disc 141 to hold the same against the valve seat 139 in opposition to the force of the compression spring 142 when the pressure in the chamber 144 is dumped. The build up of the pressure in the control passage 51 starts the engine 11 in the manner previously described.

Since the indicator 20 is sensing a safe condition, supply pressure from the interconnecting passage 61, 62, and 63 is directed into the alarm passage 59 and operates the alarm relay 60 to an open condition so that the line 63 cannot be connected to the alarm horn 64 as long as pressure exists in the alarm passage 59. With pressure in the alarm passage 59, the same acts on top of the valve disc 141 to hold the same against the valve seat 139.

At the same time when supply pressure is applied to the signal passage 79, it immediately enters the chamber 85 of the valve unit 87 and the chamber 84 of the valve unit 86 to subsequently cause the valve seat 120 of the valve unit 101 to open and the valve seat 120' thereof to close so that the indicator 23 will temporarily indicate a red flag condition and the chamber 127 of the valve unit 129 will be prevented from receiving supply pressure as in the class A, class B and class C variable operations of FIGS. 3—5.

At the same time, supply pressure is also entering into the sensor passage 105 and if the condition being sensed by the sensor 20 of the system 15D is safe, pressure will being to build up in passage 105 and thereby cause the valve units 86, 87, and 101 to cause the indicator 23 to show a green flag condition and provide pressure in the chamber 127 of the valve unit 129 to close the valve seat 136 as previously described in connection with the class A, Class B, and class C operations of FIGS. 3-5.

When the variable being sensed by the sensor 20 of the alarm system 15D is determined unsafe, a chain of events occurs in the circuit 15D, as described in connection with the class A operation of FIG. 3, to cause the indicator 23 to provide a red flag at the window 28 and the valve seat 136 to open because of the venting of the pressure from the chamber 127 of the valve unit 129.

When the valve seat 136 opens, the pressure in the alarm passage 59 vents through the open valve seat 136 because the valve unit 130 has caused the valve member 141 to be in an open condition from the valve seat 139 as previously described in connection with the class C operation of FIG. 5.

In particular, when the valve seat 136 was closed by the pressure in the chamber 127 of the valve unit 129 pressure also existed in the chamber 128 of the valve unit 130 to open the valve seat 153 allowing pressure from the chamber 140 to flow to the chamber 137. Thus when the pressure is equalized across the valve disc 141, the compression spring 142 opens the valve member 141 away from the valve seat 139 but the alarm passage 59 is prevented from being interconnected to the vent by the closed valve seat 136.

However, now that an unsafe condition has caused the valve seat 136 to open, the pressure in the alarm passage 59 is vented which causes the relay 60 to interconnect the pressure passage 63 with the alarm horn 64 and thereby provide a continuous warning sound of the unsafe condition being caused by the sensor 20 of the system 15D.

An operator who hears the alarm horn 64 can push an alarm silencing button 160 on a relay 161 that introduces pressure into the class C lockout passage 70 and chamber 144 of the valve unit 129 because of the selector member 77 of the selector means 16 being connected to the class C lockout port 48.

The pressure now in the chamber 144 of the valve unit 129 acts on the diaphragm 143 to press the valve disc 141 against the valve seat 139 which causes pressure to build up again in the alarm passage 59 which activates the alarm relay 60 and silences the alarm horn 64. The operator can now correct the unsafe variable and once the unsafe variable is made safe a chain of events occurs in the system 15D as described in connection with the class C operation of the system 15C of FIG. 5 to cause the indicator 23 to show a green flag 26 at the window 28 and the valve member 141 of the valve unit 129 to unseat and connect the chambers 140 and 137 of the valve unit 129 again whereby the variable being sensed by the sensor 20 of the system 15D is now operational and safe again.

In particular, with the sensor 20 now sensing a safe condition, pressure again builds up in the sensor passage 105 to cause the valve units 86, 87 and 101 to cause the indicator 23 to show a green flag 26 at window 28 and to have the chamber 127 of the valve unit 129 and the chamber 128 of the valve unit 130 pressurized so that the valve seat 136 is closed and the valve member 141 will open the valve seat 139 because of the opened valve seat 153 of the valve unit 130 in the manner previously described.

Therefore, it can be seen that the systems 15 of this invention can be respectively set to monitor alarm variables for the process machinery and each such alarm set system 15 will operate in the manner previously described.

Figure 7:
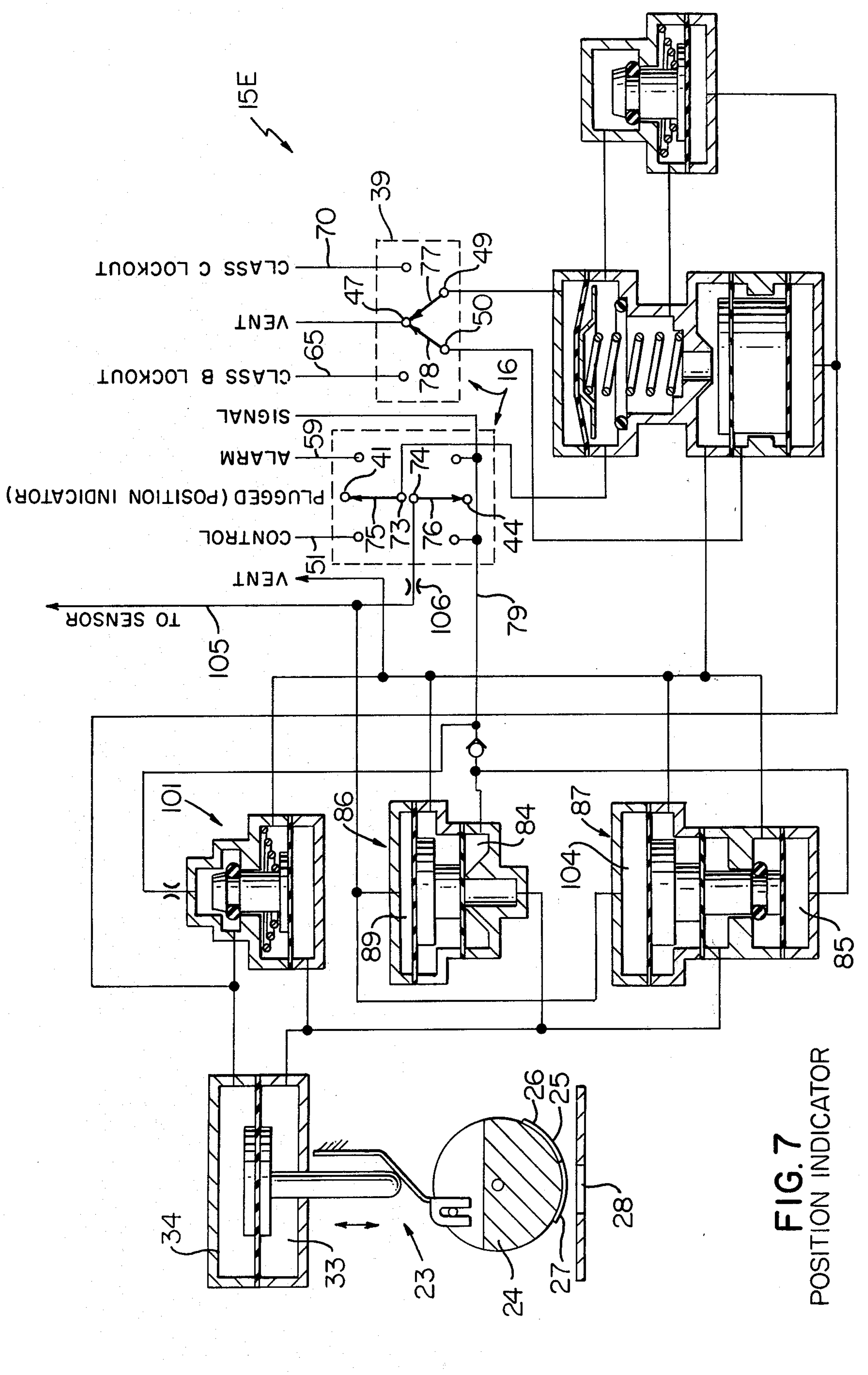
FIG. 7 is a view similar to FIG. 3 and illustrates the system set for monitoring a Position variable.

The systems 15 of this invention also can be set for monitoring Position variables of the process machinery and reference is now made to FIG. 7 wherein the system 15E has had its selector 16 set for measuring such a Position variable.

In particular, the movable members 75 and 76 of the selector means 16 are set so that the same respectively interconnect their ports 73 and 74 to plugged ports 41 and 44 whereby the members 75 and 76 do not interconnect any pressure to their ports 73 and 74 and are now dead ended.

The movable members 77 and 78 of the selector plate 39 are respectively disposed to interconnect their ports 49 and 50 with the vent port 47 as illustrated.

Since position indicators perform no other function than giving a flag indication of a variable such as a valve position opened or closed, it does not initiate a shutdown or sound an alarm. Thus, the selector means 16 is adjusted in the manner previously described so that the pressure from the control passage 51, the alarm passage 59, the class B lockout passage 65, and the class C lockout passage 70 cannot enter the indicator logic for operating the indicator 23 as previously described.

Also, pressure from the supply signal passage 79 cannot be directed to the sensor passage 105 through the orifice 106 and, thus, be directed to the chambers 104 and 89 of the valve units 87 and 86.

However, a pressure source that operates the variable to be monitored by the sensor 21 is connected to the passage 105 of the system 15B as illustrated in FIG. 1.

Supply pressure from the signal passage 79 is adapted to enter the chambers 84 and 85 of the valve units 86 and 87 whereby the valve units 86, 87, and 101 cause the indicator 23 to show a red flag condition at the window 28 thereby showing that the condition being monitored is in one position thereof, which is this example of FIG. 1 is a pneumatically operated valve 21.

When the supply pressure to the variable 21 is interconnected thereto to cause the same to move to another position thereof, such pressure now being directed into the sensor passage 105 builds up in chambers 89 and 104 of the valve units 86 and 87 to cause the valve unit 101 to interconnect the supply pressure to the chamber 34 of the indicator 23 and move the movable member 24 to position the green portion 26 of the flag means 25 at the window 28 to thereby show the device being monitored by the system 15E is in another position thereof.

When the pressure is removed from the valve 21 to cause the device 21 to move back to the other condition thereof, the sensor passage 105 is vented and thereby causes the valve units 86, 87 and 101 to operate the indicator 23 in the manner previously described to show the red portion 27 of the flag means 25 at the window 28.

Therefore, it can be seen that when a system 15 of this invention is set for monitoring a Position variable thereof, the system 15 through the flag means 25 indicates two different conditions without causing an alarm or shutdown of the process machinery.

From the above, it can be seen that each system 15 of this invention is identical to the other systems 15 and only the selector means 16 thereof is adjusted to cause that particular system to monitor one of the five conditions previously described, namely a class A variable, a class B variable, a class C variable, an Alarm variable, or a Position variable.

Thus, by merely supplying a plurality of identical systems 15 of this invention, the same can be utilized to provide proper monitoring of any desired pneumatically operated process machinery in the manner previously described whereby this invention is not to be limited to the particular pneumatic system for the engine 11 of FIG. 1.

While the forms of this invention now preferred have been illustrated and described as required by the patent statute, it is to be understood that other forms can be utilized and still fall within the scope of the appended claims.

What is claimed is:

1. A selectively changeable pneumatic control safety system for monitoring the start-up and running of process machinery, said system having a pneumatically operated indicator, pneumatically operated means for operating said indicator, and selector means for setting said pneumatically operated means to any one of a plurality of different monitoring conditions thereof which monitors a respective variable of said process machinery and will operate said indicator to indicate an unsafe condition thereof, said selector means comprising selector plate means having port means therein and manually adjustable fluid switching means carried by said plate means for selectively interconnecting various port means thereof together to provide a selected monitoring condition.

2. A system as set forth in claim 1 where said pneumatically operated indicator comprises a visual indicator.

3. A system as set forth in claim 2 wherein said pneumatically operated visual indicator comprises a movable flag.

4. A system as set forth in claim 1 wherein said pneumatically operated means comprises pneumatically operated valve means adapted to operatively interconnect one of a pressure source and a vent to said pneumatically operated indicator.

5. A system as set forth in claim 4 wherein said pneumatically operated indicator includes a housing means having a chamber therein divided into two compartments by a flexible diaphragm, said diaphragm carrying an actuator to move therewith, said valve means including a first pneumatically operated valve arrangement for operatively interconnecting one of a pressure source and a vent to one of said compartments, said valve means including a second pneumatically operated valve arrangement for operatively interconnecting one of a pressure source and a vent to the other of said chambers.

6. A system as set forth in claim 2 wherein said second valve arrangement includes two pneumatically operated valve units, one of said valve units being adapted to interconnect said source to said other chamber, the other of said valve units being adapted to interconnect said vent to said other chamber.

7. A system as set forth in claim 6 wherein said valve units are respectively adapted to be responsive to pressure from a sensor that is adapted to sense a variable of said process machinery.

8. A system as set forth in claim 1 wherein said selector means is adapted to set said pneumatically operated means to any one of a first, second, third, fourth or fifth monitoring condition thereof which monitors a respective variable of said process machinery and will operate said indicator to indicate an unsafe condition thereof said first condition being adapted to monitor a variable of said process machinery that is normally safe when said process machinery is not running, said second condition being adapted to monitor a variable of said process machinery that is normally unsafe when the process machinery is not running but must be locked out to allow start-up and must become safe within a predetermined time period after initial start-up, said third condition being adapted to monitor a variable of said process machinery that is normally unsafe when the process machinery is not running but must be locked out to allow start-up and remain locked out an indefinite time period after start-up until it becomes safe, said fourth condition being adapted to monitor an alarm variable of said process machinery that requires immediate attention upon becoming unsafe, said fifth condition being adapted to monitor a position of a variable of said process machinery.

9. A system as set forth in claim 8 wherein said pneumatically operated means has means adapted for initiating shutdown of said process machinery when an unsafe condition is sensed by said pneumatically operated means and said selector means has set the same to its said first, second or third monitoring condition.

10. A system as set forth in claim 9 wherein said means of said pneumatically operated means is also adapted to initiate an alarm when an unsafe condition is sensed by said pneumatically operated means and said selector means has set the same to its said fourth condition.

11. A system as set forth in claim 9 wherein said means of said pneumatically operated means comprises a pneumatically operated valve means.

12. A system as set forth in claim 11 wherein said valve means is adapted to block a passage from vent to prevent shutdown.

13. A system as set forth in claim 12 wherein said valve means comprises a housing means having a valve seat adapted to interconnect said passage to said vent when said valve seat is open, said means further comprising a diaphragm operated valve member for opening and closing said valve seat.

14. A system as set forth in claim 13 wherein said diaphragm operated valve member has two different and separate diaphragms for respectively moving said valve member to close said valve seat.

15. A system as set forth in claim 14 wherein said housing has another valve seat spaced from the first mentioned valve seat and in said passage to open and close said passage, and another diaphragm operated valve member for opening and closing said other valve seat.

16. A system as set forth in claim 15 wherein said pneumatically operated means includes a pneumatically operated valve arrangement for by-passing said passage around said second valve seat.

17. A system as set forth in claim 1 wherein said adjustable fluid switching means is rotatable on said plate means.

18. A system as set forth in claim 17 wherein said plate means comprise a plurality of plates each having said adjustable fluid switching means.

19. A system as set forth in claim 18 wherein each plate has a plurality of adjustable fluid switching means thereon.

20. A system as set forth in claim 19 wherein each adjustable fluid switching means as always interconnected to one port of its respective plate.

21. In a pneumatically operated control system for process machinery and having a plurality of separate safety systems for monitoring the start-up and running of said process machinery, the improvement wherein each separate safety system comprises a pneumatically operated indicator, pneumatically operated means for operating said indicator, and selector means for setting said pneumatically operated means to any one of a plurality of monitoring conditions thereof which monitors a respective variable of said process machinery and will operate said indicator to indicate an unsafe condition thereof, said selector means comprising selector plate means having port means therein and manually adjustable fluid switching means carried by said plate means for selectively interconnecting various port means thereof together to provide a selected monitoring condition.

22. A system as set forth in claim 21 wherein said pneumatically operated indicator comprises a visual indicator.

23. A system as set forth in claim 22 wherein said pneumatically operated visual indicator comprises a movable flag.

24. A system as set forth in claim 23 wherein said pneumatically operated means comprises pneumatically operated valve means adapted to operatively interconnect one of a pressure source and a vent to said pneumatically operated indicator.

25. A system as set forth in claim 24 wherein said pneumatically operated indicator includes a housing means having a chamber therein divided into two compartments by a flexible diaphragm, said diaphragm carrying an actuator to move therewith, said valve means including a first pneumatically operated valve arrangement for operatively interconnecting one of a pressure source and a vent to one of said compartments, said valve means including a second pneumatically operated valve arrangement for operatively interconnecting one of a pressure source and a vent to the other of said chambers.

26. A system as set forth in claim 25 wherein said second valve arrangement includes two pneumatically operated valve units, one of said valve units being adapted to interconnect said source to said other chamber, the other of said valve units being adapted to interconnect said vent to said other chamber.

27. A system as set forth in claim 26 wherein said valve units are respectively adapted to be responsive to pressure from a sensor that is adapted to sense a variable of said process machinery.

28. A system as set forth in claim 21 wherein said selector means is adapted to set said pneumatically operated means to any one of a first, second, third, fourth or fifth monitoring condition thereof which monitors a respective variable of said process machinery and will operate said indicator to indicate an unsafe condition thereof, said first condition being adapted to monitor a variable of said process machinery that is normally safe when said process machinery is not running, said second condition being adapted to monitor a variable of said process machinery that is normally unsafe when the process machinery is not running but must be locked out to allow start-up and must become safe within a predetermined time period after initial start-up, said third condition being adapted to monitor a variable of said process machinery that is normally unsafe when the process machinery is not running but must be locked out to allow start-up and remain locked out an indefinite time period after start-up until it becomes safe, said fourth condition being adapted to monitor an alarm variable of said process machinery that requires immediate attention upon becoming unsafe, said fifth condition being adapted to monitor a position of a variable of said process machinery.

29. A system as set forth in claim 28 wherein said pneumatically operated means has means adapted for initiating shutdown of said process machinery when an unsafe condition is sensed by said pneumatically operated means and said selector means has set the same to its said first, second or third monitoring condition.

30. A system as set forth in claim 29 wherein said means of said pneumatically operated means is also adapted to initiate an alarm when an unsafe condition is sensed by said pneumatically operated means and said selector means has set the same to its said fourth condition.

31. A system as set forth in claim 29 wherein said means of said pneumatically operated means comprises a pneumatically operated valve means.

32. A system as set forth in claim 30 wherein said valve means is adapted to block a passage from vent to prevent shutdown.

33. A system as set forth in claim 32 wherein said valve means comprises a housing means having a valve seat adapted to interconnect said passage to said vent when said valve seat is open, said means further comprising a diaphragm operated valve member for opening and closing said valve seat.

34. A system as set forth in claim 33 wherein said diaphragm operated valve member has two different and separate diaphragms for respectively moving said valve member to close said valve seat.

35. A system as set forth in claim 34 wherein said housing has another valve seat spaced from the first mentioned valve seat and in said passage to open and close said passage, and another diaphragm operated valve member for opening and closing said other valve seat.

36. A system as set forth in claim 35 wherein said pneumatically operated means includes a pneumatically operated valve arrangement for by-passing said passage around said second valve seat.

37. A system as set forth in claim 21 wherein said adjustable fluid switching means is rotatable on said plate means.

38. A system as set forth in claim 37 wherein said plate means comprise a plurality of plates each having said adjustable fluid switching means.

39. A system as set forth in claim 38 wherein each plate has a plurality of adjustable fluid switching means thereon.

40. A system as set forth in claim 39 wherein each adjustable fluid switching means as always interconnected to one port of its respective plate.

41. A selectively changeable pneumatic control safety system for monitoring the start-up and running of process machinery, said system having a pneumatically operated indicator, pneumatically operated means for operating said indicator and having a certain physical arrangement of internal parts thereof, and selector means for setting said pneumatically operated means without changing said physical arrangement of internal parts thereof to any one of a plurality of different monitoring conditions thereof which monitors a respective variable of said process machinery and will operate said indicator to indicate an unsafe condition thereof.

42. A system as set forth in claim 41 wherein the variables of said process machinery that can be selected by said selector means comprise class A variables, class B variables and class C variables.

43. A system as set forth in claim 41 wherein the variables of said process machinery that can be selected by said selector means comprise class A variables, class B variables, class C variables and alarm variables.

44. A system as set forth in claim 41 wherein the variables of said process machinery that can be selected by said selector means comprises class A variables, class B variables, class C variables, alarm variables and position variables.

45. A system as set forth in claim 41 wherein one of the variables of said process machinery said selector means is adapted to said set pneumatically operated means to monitor is a variable of said process machinery that is normally safe when said process machinery is not running.

46. A system as set forth in claim 41 wherein one of said variables of said process machinery said selector means is adapted to set said pneumatically operated means to monitor is a variable of said process machinery that is normally unsafe when the process machinery is not running but must be locked out to allow start-up and must become safe within a predetermined time period after initial start-up.

47. A system as set forth in claim 41 wherein one of the variables of said process machinery said selector means is adapted to set pneumatically operated means to monitor is a variable of said process machinery that is normally unsafe when the process machinery is not running but must be locked out to allow start-up and remain locked out an indefinite time period after start-up until it becomes safe.

48. A system as set forth in claim 41 wherein one of the variables of said process machinery said selector means is adapted to set said pneumatically operated means to monitor is an alarm variable of said process machinery that requires immediate attention upon becoming unsafe.

49. A system as set forth in claim 41 wherein one of the variables of said process machinery said selector means is adapted to set said pneumatically operated means to monitor is a position variable of a part of said process machinery.

50. A system as set forth in claim 41 wherein said selector means is adapted to set said pneumatically operated means to any one of a first, second, third, fourth or fifth monitoring condition thereof which monitors a respective variable of said process machinery and will operate said indicator to indicate an unsafe condition thereof, said first condition being adapted to monitor a variable of said process machinery that is normally safe when said process machinery is not running, said second condition being adapted to monitor a variable of said process machinery that is normally unsafe when the process machinery is not running but must be locked out to allow start-up and must become safe within a predetermined time period after initial start-up, said third condition being adapted to monitor a variable of said process machinery that is normally unsafe when the process machinery is not running but must be locked out to allow start-up and remain locked out an indefinite time period after start-up until it becomes safe, said fourth condition being adapted to monitor an alarm variable of said process machinery that requires immediate attention upon becoming unsafe, said fifth condition being adapted to monitor a position of a variable of said process machinery.

51. In a pneumatically operated control system for process machinery and having a plurality of separate safety systems for monitoring the start-up and running of said process machinery, the improvement wherein each separate safety system comprises a pneumatically operated indicator, pneumatically operated means for operating said indicator and having a certain physical arrangement of internal parts thereof, and selector means for setting said pneumatically operated means without changing said physical arrangement of internal parts thereof to any one of a plurality of monitoring conditions thereof which monitors a respective variable of said process machinery and will operate said indicator to indicate an unsafe condition thereof.

52. A system as set forth in claim 51 wherein the variables of said process machinery that can be selected by said selector means comprise class A variables, class B variables and class C variables.

53. A system as set forth in claim 51 wherein the variables of said process machinery that can be selected by said selector means comprise class A variables, class B variables, class C variables and alarm variables.

54. A system as set forth in claim 51 wherein the variables of said process machinery that can be selected by said selector means comprises class A variables, class B variables, class C variables, alarm variables and position variables.

55. A system as set forth in claim 51 wherein one of the variables of said process machinery said selector means is adapted to set said pneumatically operated means to monitor is a variable of said process machinery that is normally safe when said process machinery is not running.

56. A system as set forth in claim 51 wherein one of the variables of said process machinery said selector means is adapted to set said pneumatically operated means to monitor is a variable of said process machinery that is normally unsafe when the process machinery is not running but must be locked out to allow start-up and must become safe within a predetermined time period after initial start-up.

57. A system as set forth in claim 51 wherein one of the variables of said process machinery said selector means is adapted to set said pneumatically operated means to monitor is a variable of said process machinery that is normally unsafe when the process machinery is not running but must be locked out to allow start-up and remain locked out an indefinite time period after start-up until it becomes safe.

58. A system as set forth in claim 51 wherein one of the variables of said process machinery said selector means is adapted to set said pneumatically operated means to monitor is an alarm variable of said process machinery that requires immediate attention upon becoming unsafe.

59. A system as set forth in claim 51 wherein one of the variables of said process machinery said selector means is adapted to set said pneumatically operated means to monitor is a position variable of a part of said process machinery.

60. A system as set forth in claim 51 wherein said selector means is adapted to set said pneumatically operated means to any one of a first, second, third, fourth or fifth monitoring condition thereof which monitors a respective variable of said process machinery and will operate said indicator to indicate an unsafe condition thereof, said first condition being adapted to monitor a variable of said process machinery that is normally safe when said process machinery is not running, said second condition being adapted to monitor a variable of said process machinery that is normally unsafe when the process machinery it not running but must be locked out to allow start-up and must become safe within a predetermined time period after initial start-up, said third condition being adapted to monitor a variable of said process machinery that is normally unsafe when the process machinery is not running but must be locked out to allow start-up and remain locked out an indefinite time period after start-up until it becomes safe, said fourth condition being adapted to monitor an alarm variable of said process machinery that requires immediate attention upon becoming unsafe, said fifth condition being adapted to monitor a position of a variable of said process machinery.

* * * * *

UNITED STATES PATENT OFFICE

CERTIFICATE OF CORRECTION

Patent No. 4,143,616 Dated March 13, 1979

Inventor(s) Harley V. Bible

It is certified that error appears in the above-identified patent and that said Letters Patent are hereby corrected as shown below:

Column 19, line 29, delete "2" and insert --5--.

Column 22, line 1, delete "30" and insert --31--.

Column 22, line 63, delete "said set" and insert --set said--.

Column 23, line 9, after "set" insert --said--.

Signed and Sealed this

***Tenth* Day of *July 1979***

[SEAL]

*Attest:*

LUTRELLE F. PARKER

*Attesting Officer* *Acting Commissioner of Patents and Trademarks*